United States Patent [19]

Strozier

[11] Patent Number: 4,886,568

[45] Date of Patent: Dec. 12, 1989

[54] ADJUSTABLE RADIUS WOOD LAMINATING FIXTURE

[75] Inventor: Robert E. Strozier, Atlanta, Ga.

[73] Assignee: W. P. Stephens Lumber Company, Marietta, Ga.

[21] Appl. No.: 193,252

[22] Filed: May 11, 1988

Related U.S. Application Data

[63] Continuation-in-part of Ser. No. 150,635, Feb. 1, 1988.

[51] Int. Cl.[4] .............................................. B32B 31/00

[52] U.S. Cl. ................................. 156/443; 144/256.1; 144/263; 144/266

[58] Field of Search .................. 156/583.1, 583.5, 443; 144/254, 255, 256.1-256.3, 263-268, 349, 381; 100/211; 264/316

[56] References Cited

U.S. PATENT DOCUMENTS

| | | | |
|---|---|---|---|
| 224,757 | 2/1880 | Wright | 144/263 |
| 927,975 | 7/1909 | Kaufman et al. | |
| 1,122,750 | 12/1914 | Hice . | |
| 1,561,613 | 11/1925 | McKeown . | |
| 2,331,972 | 10/1943 | Greevy | 144/279 |
| 2,399,348 | 4/1946 | Hobbs | 144/256 |
| 2,649,132 | 8/1953 | Baurett | 100/211 |
| 2,796,095 | 6/1957 | Joseph | 144/291 |
| 2,982,332 | 5/1961 | Garrett . | |
| 4,141,775 | 2/1979 | Williams et al. | 156/358 |

OTHER PUBLICATIONS

Casati Macchine ARC50 Arch Bending Machine available from Casati Macchine at 20027 Rescaldina (MI), Italy.

Stegherr RP and RSP Bending and Laminating Fixtures available from Stegherr Maschinenbau GmbH and Co. K.G., Donaustaufer Strabe 30-Postbox 120449, D-8400 Regensburg 12, West Germany.

Four photographs of a Bending and Laminating Machine in the Federal Republic of Germany (West Germany).

Four photographs of Second Bending and Laminating Machine in the Federal Republic of Germany (West Germany).

*Primary Examiner*—David Simmons

*Attorney, Agent, or Firm*—Kilpatrick & Cody

[57] ABSTRACT

An adjustable radius wood laminate bending and gluing fixture for forming curved wood workpieces from laminate stacks by compressing the laminate stacks between two flexible bands which are drawn against adjustably positionable stanchions which define the desired curve by their position in radial slots on a stanchion supporting bed. Tension is applied to bands in order to draw them against the stanchions by cables which pass from the bands over laterally positionable cranes using hydraulic cylinders. Hydraulic cylinders are also used to reposition the cranes in the course of modifying the fixture set-up in order to produce workpieces having a different size or shape. A ruler affixed to the bed center point may be rotated about that center in order quickly and conveniently to establish stanchion position for production of workpieces having a semi-circular form.

5 Claims, 5 Drawing Sheets

ADJUSTABLE RADIUS WOOD LAMINATING FIXTURE

This application is a continuation-in-part of U.S. patent application Ser. No. 07/150,635 filed Feb. 1, 1988, which is incorporated herein in its entirety by reference.

BACKGROUND OF THE INVENTION

The present invention relates to equipment for bending and pressing wood laminations into curved forms.

Curved wood forms have long been used in a variety of applications. Curves desired include cyma curves, arcs, circles, S-curves and other shapes. Production of wood members having a desired curved form has previously been achieved by utilizing wood which grew in that form, by cutting the form from stock large enough to accommodate the curve, by steam-bending techniques, and by glue laminating thin layers of wood which can easily be bent into the desired form prior to bonding the laminations together. Curved members formed of laminations are highly desirable in many applications because of the superior strength and stability of such members as compared to solid wood structures of the same size and shape, because very tight curves can be achieved and because curved shapes can be produced which are not possible using solid wood.

Production of large-scale, multi-lamination wood forms is difficult, however, because of the need for a means for bending the laminations to and holding them in precisely the correct shape and relationship for a sufficient period of time to permit the adhesive or glue being used to cure. This must normally be accomplished by applying substantial amounts of opposing pressure normal to and distributed over substantially all of both sides of a workpiece made up of multiple layers of wood and uncured adhesive or glue.

A variety of shop-built and commercial machinery has previously been used to fabricate such curved members, including the Casati Macchine ARC50 arch bending machine available from Casati Macchine at 20027 Rescaldina (MI), Italy; the Stegherr RP and RSP bending and laminating fixtures available from Stegherr Maschinenbau GmbH and Co. K.G., Donaustaufer Strabe 30-Postbox 120449, D-8400 Regensburg 12, West Germany; and the devices disclosed in U.S. Pat. Nos. 927,975, 1,561,613, 2,331,972, 2,399,348, 2,796,096 and 4,141,775.

While many of the prior art machines can be successfully used to produce curved wood members, much of the prior art equipment is prohibitively expensive, difficult to use or difficult to adapt rapidly to production of different sizes of curved members.

Despite the deficiencies of the prior art equipment and techniques available for fabricating "half-round top" window and door frames by glue lamination of thin wood layers, the demand for such windows, doors and other architectural structures having similar curves has expanded enormously with the growth in the popularity of post-modern architecture.

Consequently, there is a substantial need for a curve-forming laminating fixture which is sturdy, well-suited for use in high volume production, utilizes a minimum amount of shop floor space, and of substantial importance, which can accommodate a variety of frame sizes economically and easily.

SUMMARY OF THE INVENTION

The adjustable radius wood laminate bending and gluing fixture of the present invention bends and compresses a workpiece that is typically a stack of laminations and adhesive between two flexible bands that are drawn against adjustably positionable stanchions that define the desired curve for the workpiece by the position of the stanchions in radial slots in a bed. The bands are tensioned by hydraulic jacks or cylinders acting on cables which pass through appropriate pulleys and attach to the band ends. Cranes from which the cables depend are positionable utilizing additional hydraulic cylinders to place them at the appropriate spacing for a particular shape of workpiece being produced. The fixture operates vertically so that it occupies a minimum amount of floor space and provides convenient access to the portion of the machine where laminations are positioned.

Use of two bands and separate hydraulic cylinders pulling on each end of each band makes it possible to slide the bands relative to one another and to slip both bands slightly in either direction, which is sometimes desirable in order to achieve optimal positioning of the workpiece and laminations within the workpiece.

The present invention thus provides a sturdy, reliable and easily-adjusted fixture for lamination of veneers and bending plywood into curved members in a wide variety of shapes and sizes.

Other features and benefits of the present invention will become apparent by reference to the following description of the invention and the accompanying drawings.

DETAILED DESCRIPTION OF THE DRAWINGS

Figure 6:
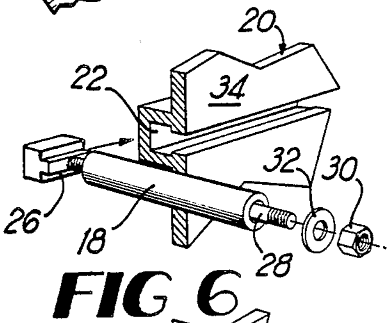
FIG. 6 is an exploded perspective view of a portion of the bed and one stanchion showing a means for mounting the stanchion.
Figure 7:
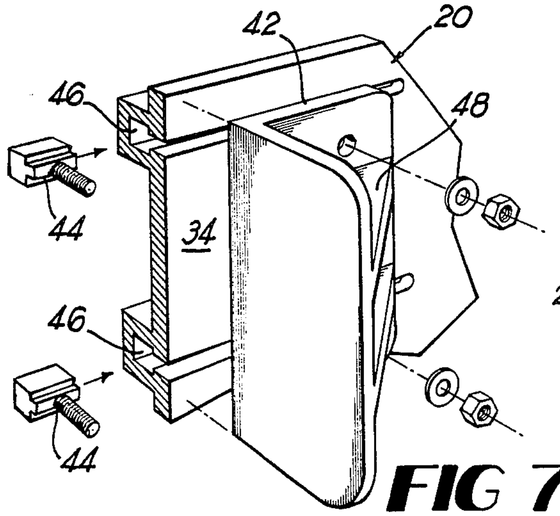
FIG. 7 is an exploded perspective view of a portion of the bed and a side plate illustrating mounting of the side plate.
Figure 8:
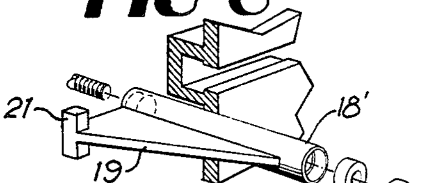
FIG. 8 is an exploded perspective view of a portion of the bed and an alternative stanchion with a gusset and bushings to receive the mounting bolt.

The adjustable radius wood laminate bending and gluing fixture 10 of the present invention provides a means for bending a workpiece 12 of laminations to a desired curved shape and applying pressure to the sides of the workpiece during gluing of its laminations by capturing the workpiece between a flexible inner band 14, which conforms to the shape established by stanchions 18, and an outer band 16. Stanchions 18 protrude from a bed 20, which bed has a series of radial "T" slots 22 which radiate from the bed center 24. As is best shown in FIGS. 6, 7 and 8 each slot may be a "T" shaped opening of a type conventional in machinery beds. Slot 22 captures a "T" nut 26 on a bolt 28 which passes through stanchion 18. Stanchion 18 may be an appropriate length of pipe as shown in FIG. 6. A nut 30 and washer 32 on the opposite end of bolt 28 is tightened to draw the stanchion against the bed face 34 and secure it in position. When desired, each stanchion may be reinforced as shown in FIG. 8 with a triangular gusset plate 19, which acts as a leg to resist the force applied against the side of stanchion 18' opposite the gusset plate 19. The protruding corner of gusset plate 19 may have a foot 21, which is a short section of bar welded to the plate 19 in order to bridge "T" slots 22 in bed 20. Stanchion 18' is machined to receive bushings 23 in its ends in order to accommodate a smaller diameter mounting bolt.

Figure 1:
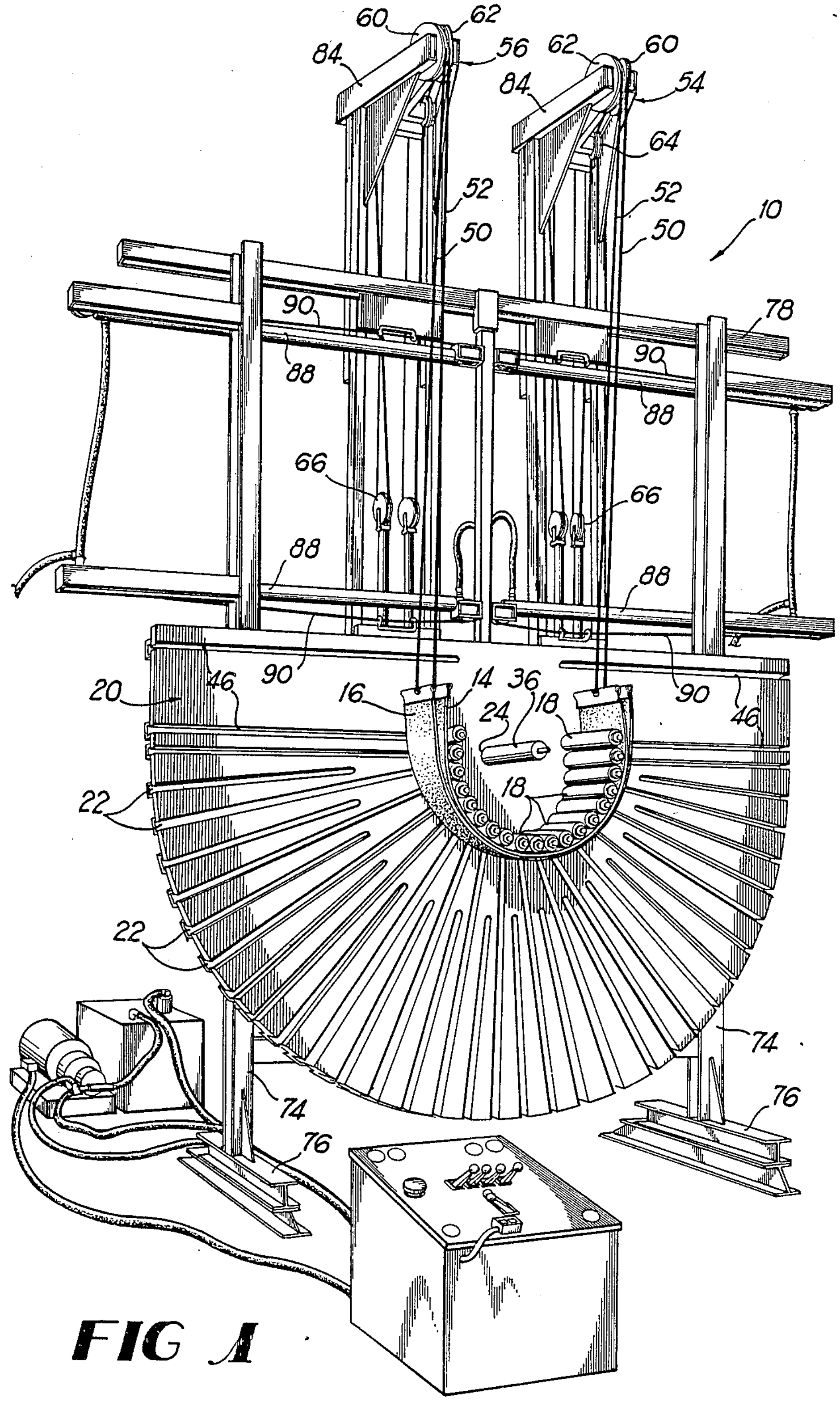
FIG. 1 is a front perspective view of the adjustable radius wood laminate bending and gluing fixture of the present invention, including associated hydraulic pump and control mechanisms.
Figure 2:
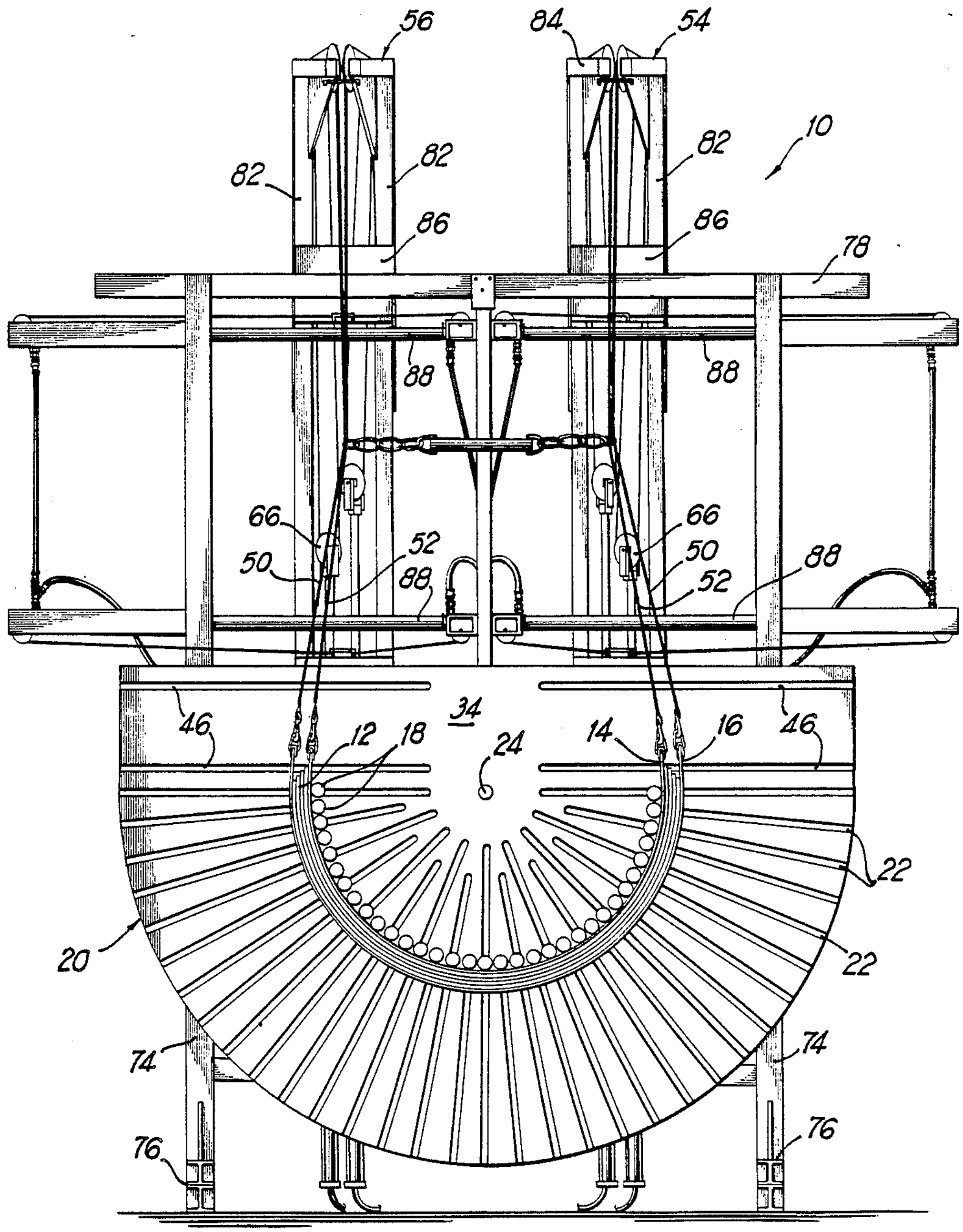
FIG. 2 is a front elevation view of the bending and gluing fixture shown in FIG. 1.
Figure 3:
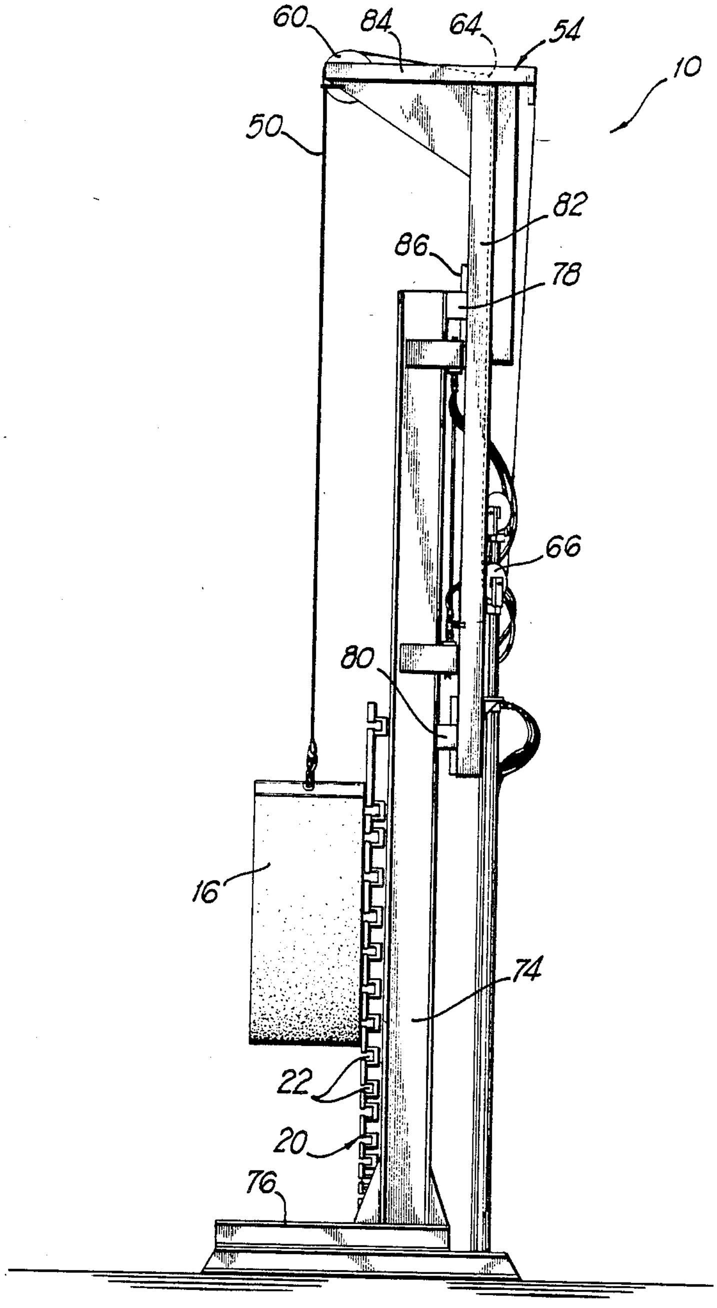
FIG. 3 is a right side elevation view of the bending and gluing fixture shown in FIG. 1.
Figure 4:
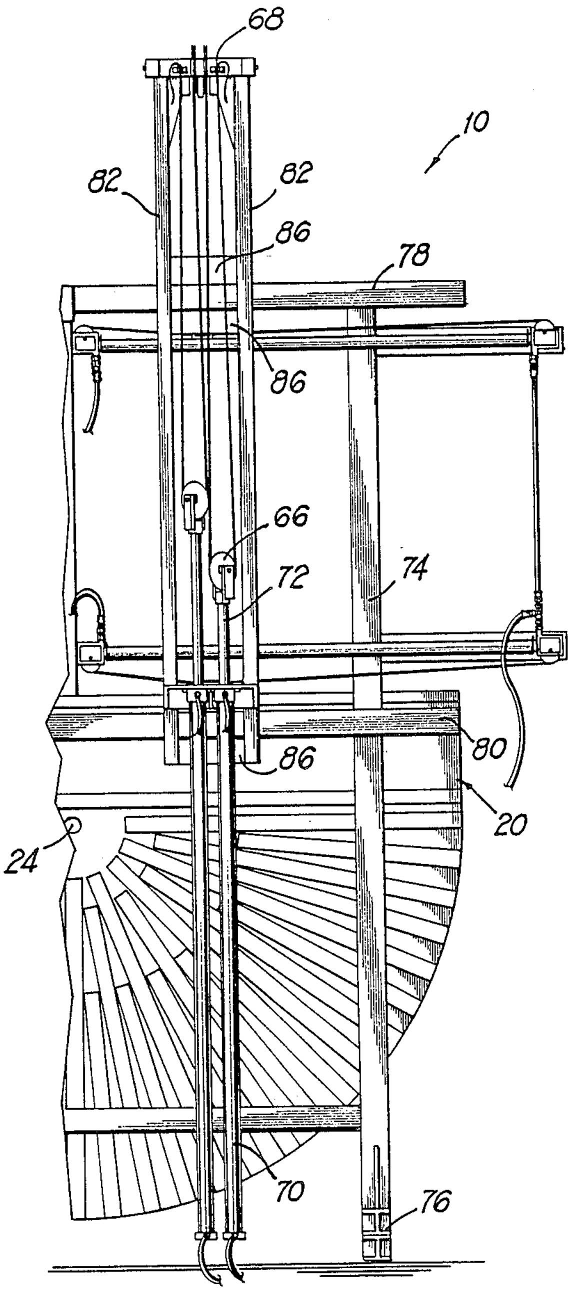
FIG. 4 is a rear elevation view of one side of the bending and gluing fixture shown in FIG. 1 (of which the other side is substantially a mirror image).
Figure 5:
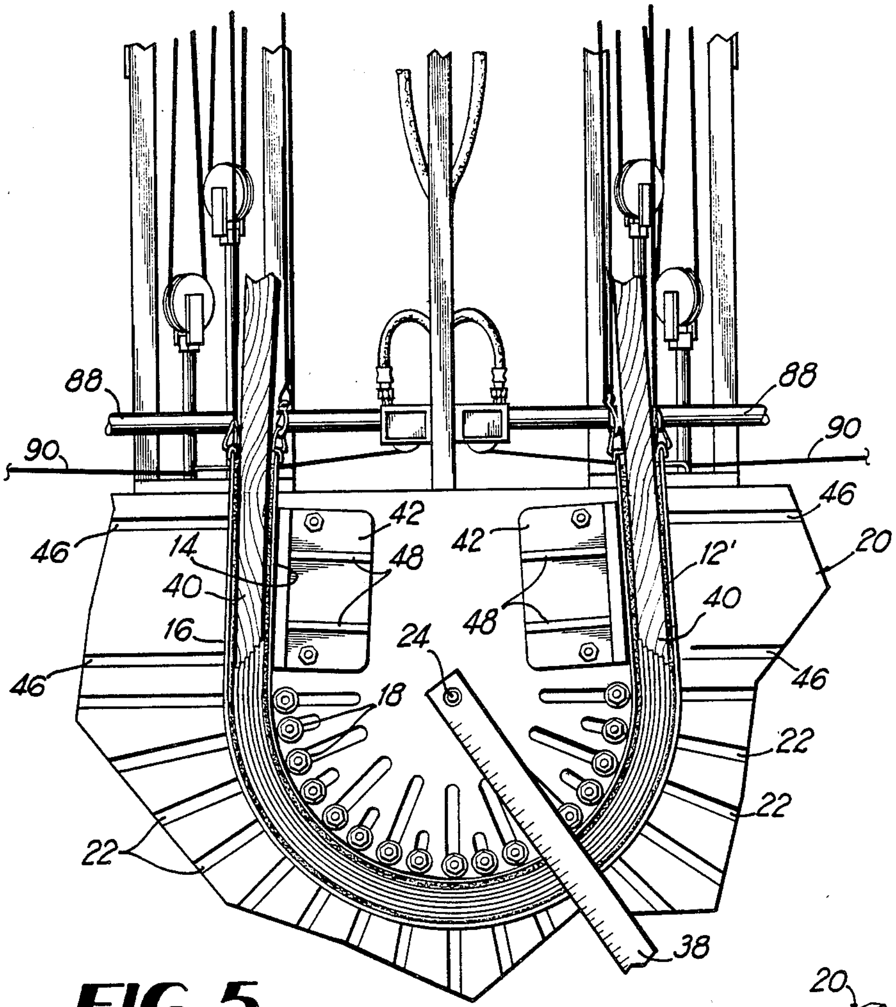
FIG. 5 is an enlarged view of the central portion of the bending and gluing fixture of the present invention shown with a workpiece, side plates and straight sections of lumber attached to the workpiece and apparatus for positioning stanchions.

As will be appreciated by reference to FIG. 5, utilization of slots 22 which radiate from the center 24 of bed 20, together with a center stanchion 36 (best seen in FIG. 1) makes it possible very easily and quickly to relocate stanchions 18 along a desired radius in order to set up the laminate bending and gluing fixture 10 for a new size and/or shape of workpiece 12 or 12'. This may be done by attachment of one end of a ruler 38 to center stanchion 36 to permit rotation of ruler 38 about the bed center 24. Each stanchion 18 may then be positioned within its slot 22 at the same distance from center 24 by reference to the ruler 38, thereby very quickly positioning stanchions 18 in a semicircle of desired size. The workpiece 12' illustrated in FIG. 5 differs from workpiece 12 illustrated in FIG. 2 in that it is attached to straight sections 40, as may frequently be desired when the workpiece 12' is used for a "round-top" window or door. Attachment of such a solid wood or laminated section 40 is facilitated by the use of side plates 42, against which such straight sections can be clamped. Side plates 42 are attached to bed 20, as may be seen in FIG. 7, using bolts 44, that are captured in side plate "T" slots 46, which are located horizontally in bed 20 above center 24. Side plates 42 may be fabricated of right-angle metal sections with reinforcing gussets 48.

As is illustrated in all of FIGS. 1, 2, 3 and 5, and further described below, tension is applied to both ends of bands 14 and 16 by cables 50 and 52, which pass over cranes 54 and 56 located generally above bed 20. The relative horizontal positions of cranes 54 and 56 are adjustable in order to accommodate fixture 10 setups and workpieces 12 and 12' having differing widths. When it is desired that workpiece 12 ends be drawn inward to compensate for spring back, it is sometimes also desirable to use a cable harness 58 (shown in FIG. 2) to draw the pairs of cables 50 and 52 closer together near bands 14 and 16 in order to draw the workpiece ends 12 inward.

As will be understood by reference to FIGS. 1-4, each cable 50 and 52 passes from its respective band 16 or 14 end up over a pulley 60 or 62 mounted on the crane 54 or 56 above bed 20, over a second rear pulley 64 in crane 54 or 56, through a hydraulic ram pulley 66 positioned on the back side of crane 54 or 56 and then back up to a tie point 68 near the top of crane 54 or 56. As will be readily understood by reference to the figures, actuation of each hydraulic ram 70 by causing its rod 72 to be drawn into the ram will cause the ram pulley 66 to move down, thereby causing the cable 50 or 52 end attached to its respective band to be pulled up, thus applying tension to the band 14 or 16 to which it is attached.

The preferred embodiment of the present invention utilizes a bed 20 oriented vertically to minimize shop floor space occupied by the bending and gluing fixture 10 and to make the bands 14 and 16 readily accessible for insertion and removal of workpieces 12. As will be understood by one of ordinary skill in the art, it would be possible to utilize other orientations, including one in which the stanchions 18 protrude upward from a horizonal bed 20. Such an orientation typically will not be as desirable as a vertical one, however, for the reasons noted and additional ones such as the tendency with a horizontal orientation for glue squeeze-out to drop down onto and then accumulate on and in the bed 20.

In the embodiment of the fixture 10 illustrated in the figures, bed 20 is supported by mounting it on the front of uprights 74, which may be sections of steel "I" beam standing on feet 76. Upper and lower crane tracks 78 and 80, which may also be in sections of steel "I" beam oriented horizontally, are mounted on the back of uprights 14. Cranes 54 and 56 are each constructed from two columns 82 which support cantilevered crane arms 84 at the upper ends of columns 82. Crane arms 84 extend beyond the front of the bed 20 and support pulleys 60 and 62 from which cables 50 and 52 pass to the ends of bands 14 and 16. Track-engaging plates or other suitable structures 86 affixed to the fronts of columns 82 engage tracks 78 and 80 to permit cranes 54 and 56 to slide to the right or left along tracks 78 and 80. Such lateral movement of crane 54 and 56 may be conveniently and quickly achieved utilizing hydraulic rams 88, which act horizontally to move cables 90 to which cranes 54 and 56 attach, thereby achieving power-actuated horizontal movement of the cranes. Conventional compensating controls and apparatus may be utilized to ensure synchronized movement of corresponding upper and lower hydraulic cylinders 88 so that side-to-side travel of cranes 54 and 56 will be smooth and coordinated.

Bands 14 and 16 may be fabricated from suitable lengths of stainless steel, composite fabric and rubber belting or other suitable structures.

As will be readily apparent to one of ordinary skill in the art, workpieces 12 and 12' having shapes other than those illustrated in the figures, including sections of ovals, ellipses and other generally convex shapes may be formed on the fixture 10 of the present invention by appropriately positioning stanchions 18. Shapes including reverse curves may be formed if suitable auxiliary clamping means is used to insure that pressure is exerted against all portions of the workpiece.

Persons skilled in the art will also readily recognize that other embodiments of the above-described invention may be easily constructed and utilized while continuing to realize the advantages of the described invention without departing from the scope and spirit of the preceding description of the invention and the following claims.

I claim:

1. An adjustable wood laminating fixture for producing a plurality of shapes and sizes of curved wood forms from a plurality of wood laminations, comprising:

a. a metal bed having slots radially oriented about a central point, b. a plurality of stanchions positionable on the bed by engaging the slots, c. a measuring means rotatable about the bed central point to assist in locating stanchions at a predetermined radius from the central point, d. an inner band which may be drawn against the stanchions to establish an inner laminating surface, e. an outer band which may be drawn against a workpiece positioned between the inner and outer bands, which outer band forms an outer laminating surface, and f. a means for pulling the band ends.

2. The wood laminating fixture of claim 1, wherein said means for pulling the bands comprises at least one movable crane, at least one cable which passes over the crane and attaches to a band end, and means for applying tension to the cable.

3. The wood laminating fixture of claim 2, wherein the means for applying tension comprises at least one hydraulic cylinder.

4. The wood laminating fixture of claim 1, further comprising at least one hydraulic cylinder acting on at least one cable to move at least one crane horizontally in order to reposition it.

5. The wood laminating fixture of claim 1 wherein said means for pulling the bands includes means for sliding the bands relative to each other while the band ends are being pulled.

* * * * *